June 14, 1966  M. LAGUERRE  3,255,501
RESILIENT STRAP FASTENER
Filed Dec. 27, 1963

3,255,501
RESILIENT STRAP FASTENER
Maxime Laguerre, 11 rue Berteaux-Dumas,
Neuilly, France
Filed Dec. 27, 1963, Ser. No. 333,966
Claims priority, application France, Jan. 2, 1963,
920,315, Patent 82,876
1 Claim. (Cl. 24—16)

The present invention relates to straps made of resilient synthetic plastic or like material, of the type comprising a head portion, provided with one or several apertures, and a flat strip body portion formed with teeth, cuttings or projections adapted for engagement and locking in one of said apertures.

It is an object of the present invention to provide fasteners of this type with an opening which is especially designed for enabling two or more identical fasteners to be assembled end to end. Such a special aperture will be denominated hereinafter a "hooking" opening.

The hooking opening according to the present invention has a larger dimension which exceeds the maximum width of the strip and includes first and second contiguous parts, the larger dimension of said first part being substantially equal to the minimum width of the strip and the smaller dimension of said first part being substantially equal to the thickness of the strip, said first part being more remote from the strip body portion than said second part, a pair of spaced opposed projections defining a connecting passage between said first and second parts, said connecting passage having a width smaller than the minimum width of the strip.

This and other objects of the invention will become apparent from the following description.

Figure 1:
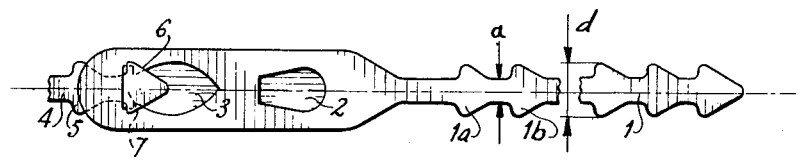
FIG. 1 is a perspective view of a fastener provided with a first aperture which performs the locking function and with a hooking opening, and of the free end of another fastener inserted into said hooking opening so as to couple the two fasteners together.

The fastener as shown in FIG. 1 comprises a flat strip body portion 1 of which only a small part is shown in the figure, this body portion being formed with serrations such as 1a, 1b. These serrations are adapted to be engaged into opening 2 of the head portion of the fastener, for the purpose of securing the loop which is formed by the strip around an article to be attached, as is well known in the art.

The head portion is provided with a supplementary opening 3 which is adapted for hooking the end of the body portion of a second identical fastener 4.

The second fastener also has projecting portions, such as 5 and 6, and, in general, is identical to the one to which it hooks. For inserting the end of the body portion of the second fastener into the hooking opening 3 said end is held in such a way that its plane is perpendicular to that of the hooking opening and parallel to the length of the said opening, which length exceeds the maximum width $d$ of the projecting portions 5. Stated in another way, the end of the body portion of the second fastener is inserted transversely into opening 3.

When the terminal projection 6 of the second fastener is entirely inserted in opening 3, the end of the body portion of the second fastener is turned through an angle of 90° and rotated down in such a way that the narrow strip portion of width $a$ between serrations 5 and 6 engages by force into the smaller portion 7 of the hooking engagement opening. In this way, a hooking as illustrated in FIG. 1 is obtained.

It is to be understood that an efficient end-to-end hooking connection of two or several identical fasteners offers the possibility to utilize the assembly with as much ease and dependability as would be the case with only one fastener of greater length, the locking opening of one of the terminal fasteners of the assembly cooperating with the body of the other terminal fastener in order to secure the fastening of the loop which is formed around an article to be attached.

It will be noted that the hooking opening of the last mentioned of the two said terminal fasteners, which opening does not actually perform any hooking function in this case, may serve as a locking opening.

Figure 2:
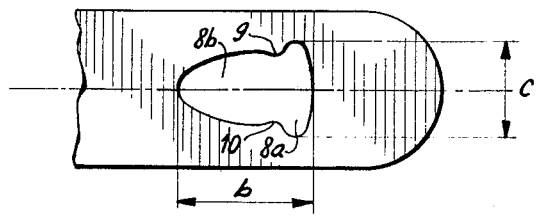
FIG. 2 is a plan view of a part of the head portion of a fastener showing a hooking aperture according to a first embodiment of the invention.
Figure 3:
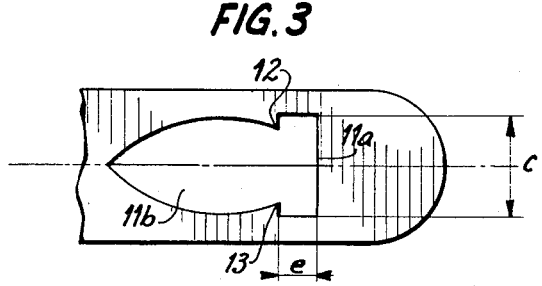
FIG. 3 illustrates a modified embodiment of said hooking aperture.

FIGS. 2 and 3 illustrate two embodiments of the shape of the hooking opening.

In the embodiment of FIG. 2, the hooking opening comprises a portion 8a, the length $c$ of which is substantially equal to the minimum width $a$ of the strip. The portion 8a is separated from a portion 8b by two bosses 9 and 10. The maximum length $b$ of the hooking opening exceeds the maximum width $d$ of the body portion of the second fastener which is to be hooked onto the first.

The end of said body portion is inserted as indicated above with reference to FIG. 1. Then, when the terminal serrations are entirely inserted, the end of the body portion is turned through 90°, the narrow strip portion between the two terminal serrations moves the two bosses 9 and 10 aside (which are at a distance one from the other which is slightly less than the width $a$ of said narrow strip portion, but which has a certain elasticity), and said end is locked into the portion 8a.

Then the body portion of the second fastener is rotated down so that it substantially extends in the plane of the head portion of the first fastener.

The efficiency of the hooking is due to the bosses. In the modified embodiment of FIG. 3, the bosses are substituted by cut-outs 12 and 13, which are provided between the two portions 11a and 11b of the hooking opening.

The width $a$ of portion 11a is substantially equal to the thickness of the body portion of the fastener, and its length $c$ is hardly larger than or is substantially equal to the width $a$ of the narrow strip portion between two projections. Insertion of the end of the body portion of the second fastener into the hooking opening is effected as indicated above with reference to FIGS. 1 and 2.

The locking of the free end of the second fastener within portion 11a of the opening is particularly efficient, as the latter substantially has the same cross-section as the narrow strip portions between two projections.

When the hooking fasteners are tied around an article to be attached, it will be necessary in practice for disconnecting the loop to cut off that end of their head portion which includes the hooking opening. Therefore, it is advantageous that such a fastener be provided, as disclosed, with a locking opening independent and distinct from its hooking opening, in order to enable the said fastener to be re-used after its hooking opening has been cut-off.

What is claimed is:

A fastener device of resilient material for attaching to an article, comprising a head portion formed with at least two apertures and a flat strip portion extending from said head portion and having opposite sides with laterally extending projections thereon at intervals along the strip portion, said strip portion being bendable into a loop to embrace said article, at least one of said apertures being a locking aperture, the projections being insertable into said locking aperture so that one or more projections may be passed through said aperture, the projections being shaped so as to prevent return movement of the strip portion through the locking aperture, thus securing the loop around the article, another one of said apertures being a hooking aperture and having a larger dimension which exceeds the maximum width of the strip portion as measured from the projections on one side of the strip portion to those on the other side thereof, said hooking aperture including first and second contiguous portions the first of which has a largest dimension which is substantially equal to the minimum width of the strip portion in the intervals between the projections, the smallest dimension of said first contiguous portion being substantially equal to the thickness of the strip portion, said first contiguous portion being more remote from the strip portion than said second contiguous portion, and a pair of spaced opposed projections defining a connecting passage between said first and second contiguous portions, said connecting passage having a width smaller than said minimum width of the strip portion.

References Cited by the Examiner

UNITED STATES PATENTS 3,072,986    1/1963    Lefnaer _____ 24—16

FOREIGN PATENTS 1,287,493    2/1962    France.
806,004      6/1951    Germany.
237,140      7/1925    Great Britain.
346,341      3/1931    Great Britain.

WILLIAM FELDMAN, *Primary Examiner.*

DONLEY J. STOCKING, *Examiner.*

E. SIMONSEN, *Assistant Examiner.*